July 7, 1970    R. H. JOHNSON ET AL    3,519,024
DEVICE FOR THE PREPATTERNED CONTROL OF FLOW DISTRIBUTION IN
FLUID FLOW EXPERIENCING A CHANGE IN AREA AND/OR DIRECTION
Filed Jan. 6, 1966    4 Sheets-Sheet 1

Inventors:
Robert H. Johnson;
Josef Herzog,
by
Their Attorney.

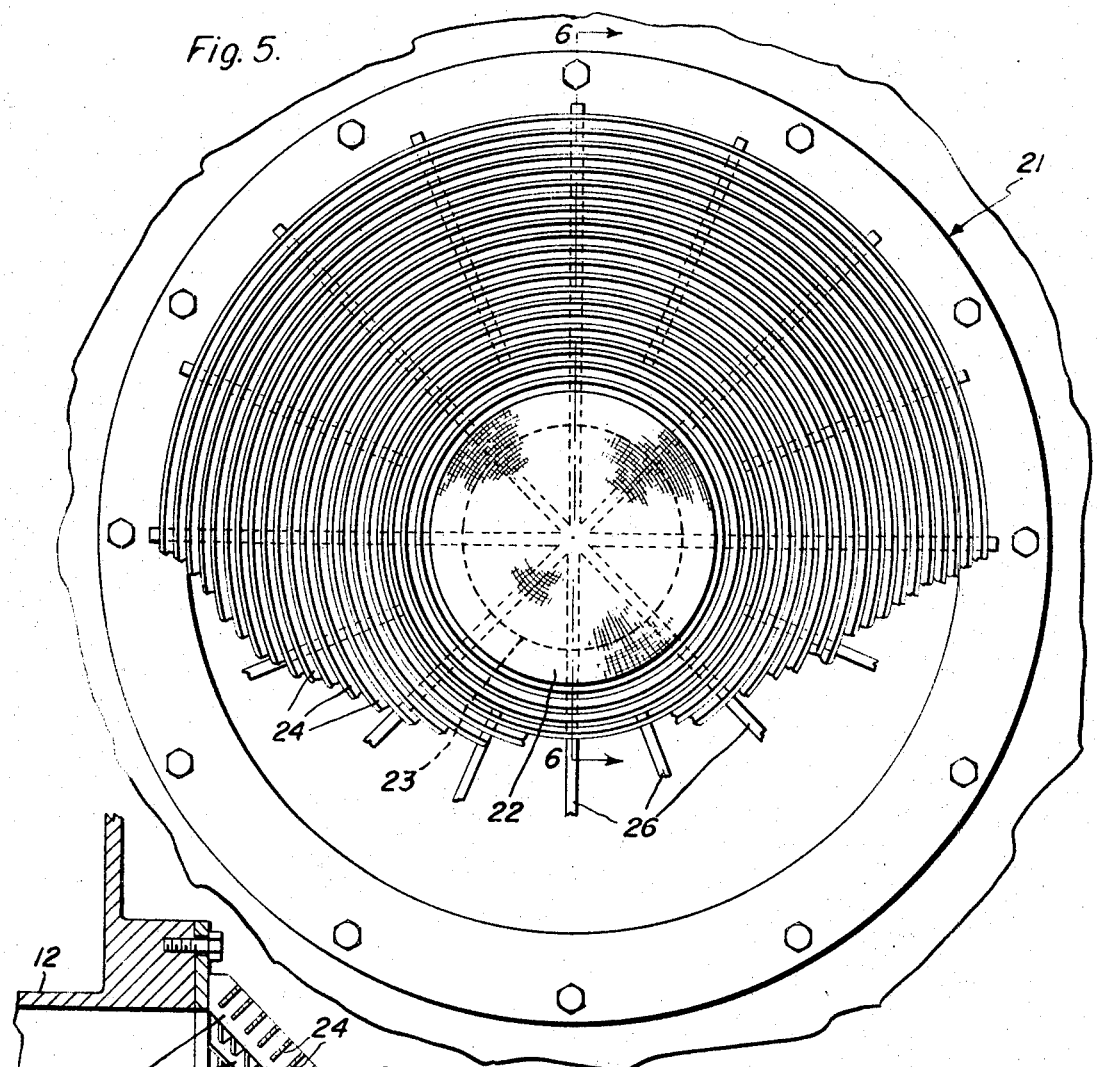
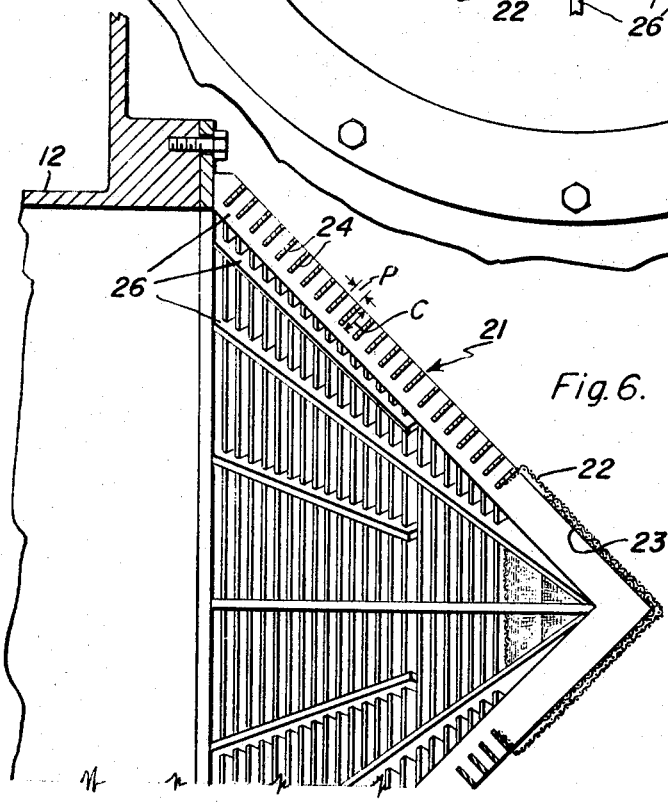
Fig. 5.
Fig. 6.
Inventors:
Robert H. Johnson;
Josef Herzog,
by
Their Attorney.

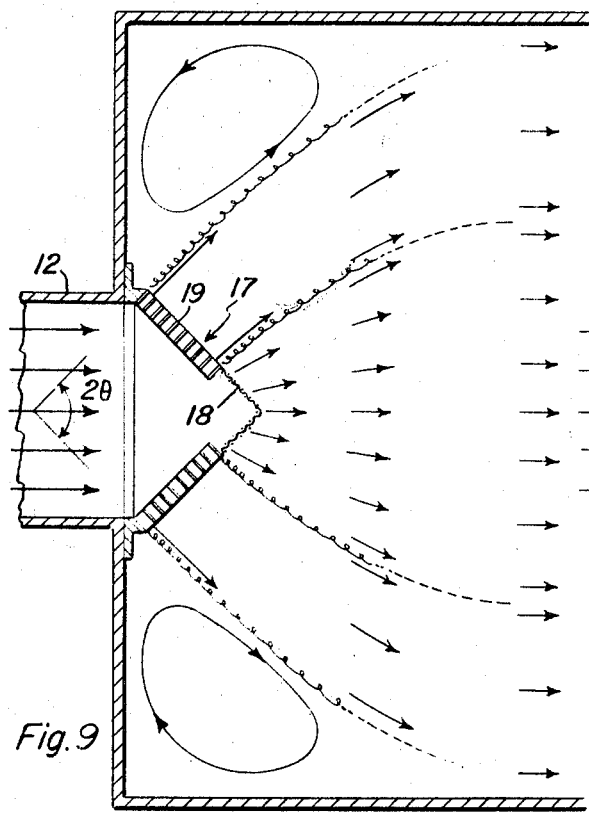
Fig. 9
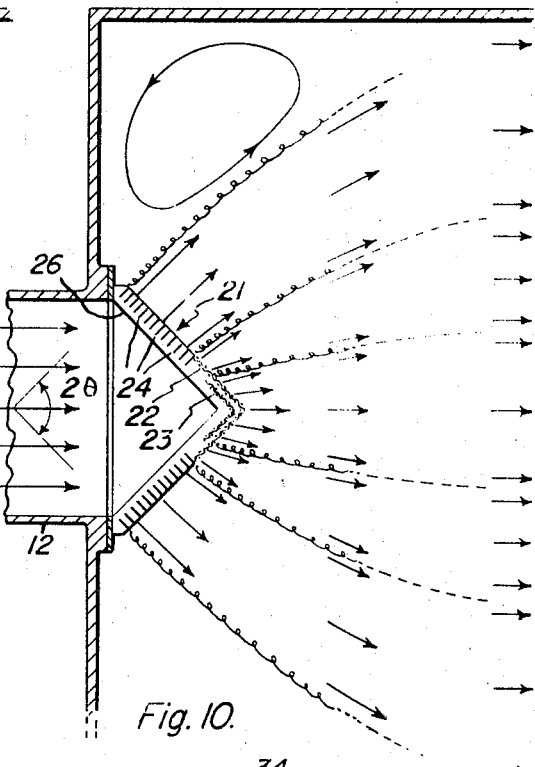
Fig. 10.
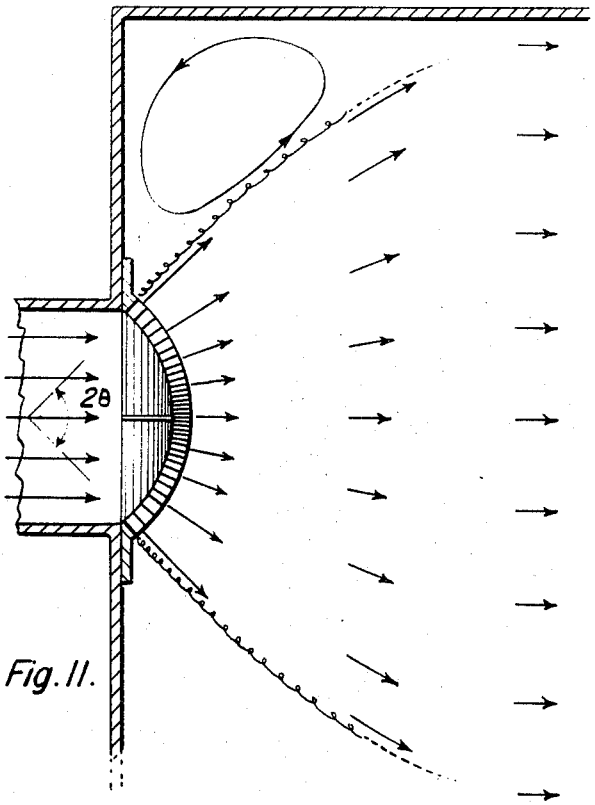
Fig. 11.
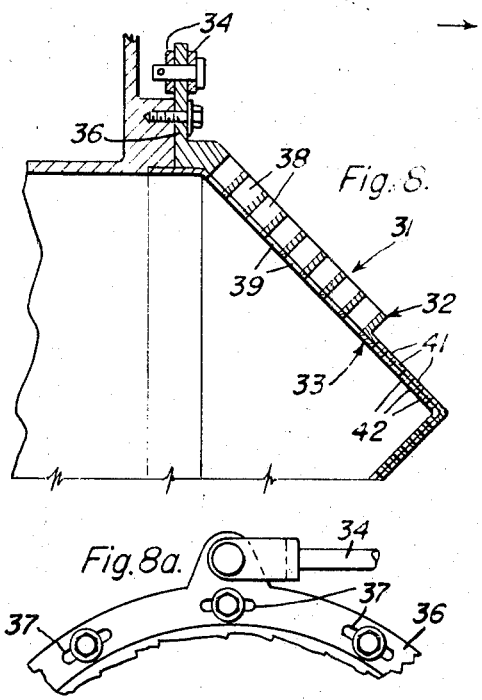
Fig. 8.
Fig. 8a.
Inventors:
Robert H. Johnson;
Josef Herzog,
by
Their Attorney.

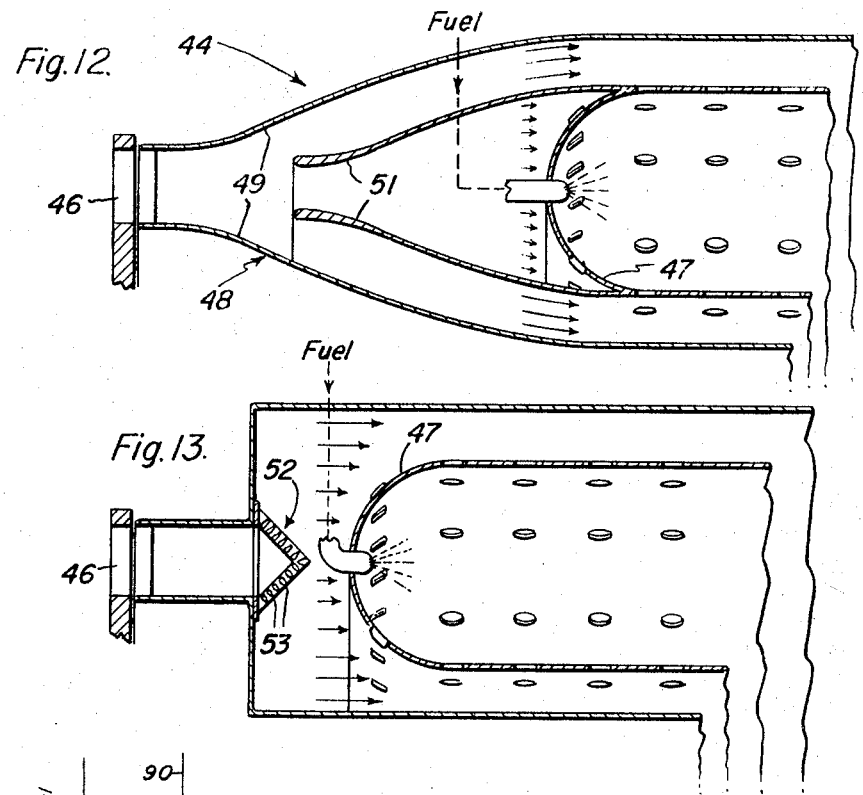
Fig. 12.
Fig. 13.
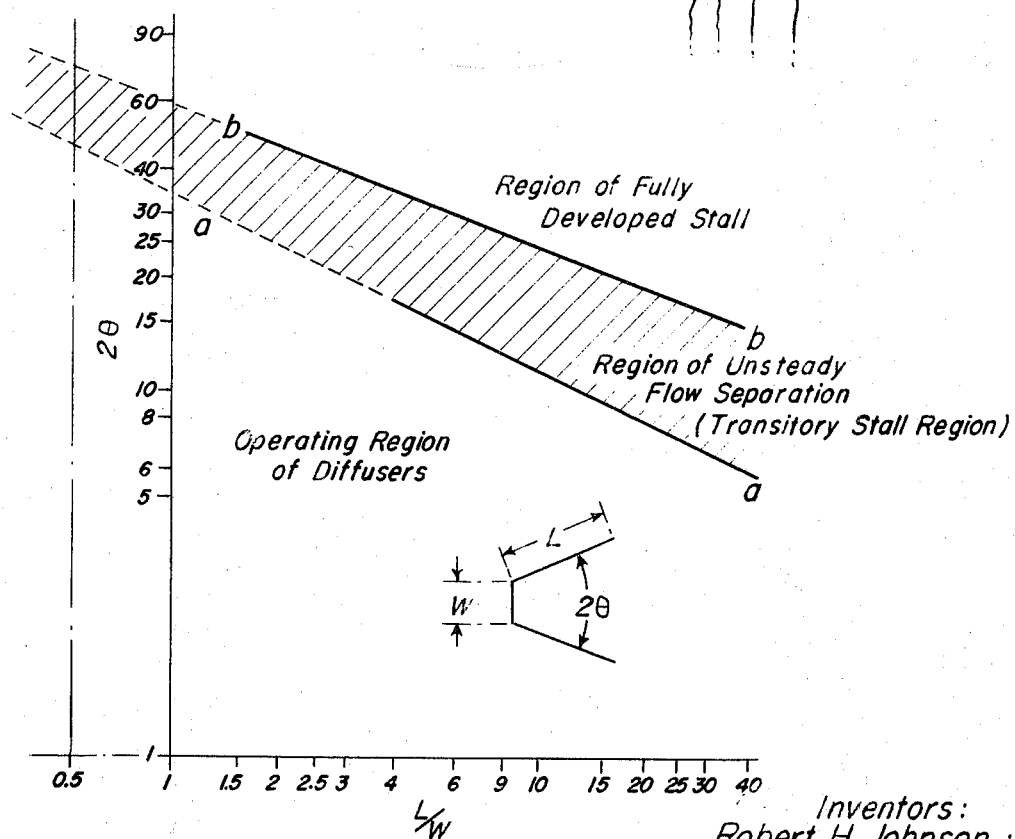
Fig. 14.

United States Patent Office 3,519,024
Patented July 7, 1970

3,519,024
DEVICE FOR THE PREPATTERNED CONTROL OF FLOW DISTRIBUTION IN FLUID FLOW EXPERIENCING A CHANGE IN AREA AND/OR DIRECTION
Robert H. Johnson, Schenectady, and Josef Herzog, Scotia, N.Y., assignors to General Electric Company, a corporation of New York
Filed Jan. 6, 1966, Ser. No. 519,068
Int. Cl. F15d 1/00
U.S. Cl. 138—41       12 Claims

ABSTRACT OF THE DISCLOSURE

A flow distribution device and a method are described for deliberately imposing energy loss and flow deflection in a controlled manner to produce a plurality of nesting sheets of free stream jets, adjacent sheets being separated by shear layers, which gradually disappear as the flow becomes a pre-determined three-dimensional fluid flow distribution a short distance downstream. The nesting free stream flows are created by apertures of different sizes at least some of which are defined by blade-like members. The apertures receive and impress a prepatterned flow resistance/flow deflection pattern on the fluid flow. Apertures imposing the greatest flow deflection present the least resistance to flow, while apertures imposing the least flow deflection present the greatest resistance to flow. These impressed relationships of flow resistance and flow deflection utilize energy and momentum derived solely from the fluid flow itself.

---

This invention is directed to a device for distributing fluid flow in a ducting component and, more particularly, to a prepatterned flow distributing device wherein in the absence of diffuser walls it is possible to obtain a predetermined flow distribution having substantially any desired gradient of total pressure within a relatively short distance downstream of the entry of an inlet conduit to a region of changed flow area and/or flow direction.

BACKGROUND OF THE INVENTION

Although this invention will be described in connection with steam flow through a moisture separator, this invention has general utility in numerous applications, for example, in angle diffusers, in the transition region between the compressor and combustion chamber of a gas turbine, in wide angle diffusers, in short diffuser passages, such as involve a sudden expansion and in controlled velocity distributors and diffusers wherein gas enters at high velocity and the energy therein is conserved by conversion of the velocity to pressure and/or where the flow velocity distribution must be controlled. In each instance the device of this invention, because of its maximum solidity (closed area/total area) of about 50% does not produce any substantial amount of shear in the fluid passing therethrough and separation of the fluid flow into discrete streams or droplets cannot occur. Thus, the flow distribution is completely different from that occurring in connection with the atomization and distribution of droplets or in the provision of discrete streams of fluid as occurs through spray nozzles.

It is to be understood that this invention is advantageously applicable both to liquid and to gaseous flow and both to multiple and single phase systems.

The problem of flow distribution for which this invention offers an effective solution is best illustrated in connection with an incoming fluid flow, which must make the transition from a comparatively small inlet conduit to a downstream chamber of much larger cross sectional area, such as occurs in the flow of wet steam into a moisture separator, where the cross sectional area of the downstream chamber (the interior of the moisture separator) is typically greater than about twice the area of the entrance conduit thereto. The function of the separator unit is to remove from the incoming steam (the discharge from a nuclear high pressure turbine) the droplets of water entrained therein in order to prepare the steam for use in a low pressure turbine. The efficiency of the overall turbine unit is increased by more effective moisture removal. In order to carry out this function to best advantage, the incoming flow of steam should be made to spread itself out with a minimum of losses into a uniform velocity profile across the largest possible extent of the entire separation facility located within the separator chamber. In the event of irregular velocity profiles at the face of the separator elements blowthrough of moisture occurs and results in reduced turbine efficiency due to the braking effect of the moisture on the gas and rotor blades and erosion of the rotating parts of the turbine resulting in charged blading configurations.

This distribution into a desired velocity profile over an area considerably larger than the area of the incoming conduit can, of course, be accomplished with well-known diffuser construction wherein the diverging walls of a passage are relied upon to provide a gradual increase in cross-sectional area of flow for the fluid. However, the greater the angular divergence of such a walled passage, the shorter the length of wall along which the fluid can be relied upon to flow without detaching itself from the wall and thereby reaching an unstable condition. These limiting conditions for stable diffuser operation are described in greater detail in the Transactions of the ASME (September 1959) Journal of Basic Engineering, on p. 322 of the article, "On the Nature of Stall" by S. J. Kline (p. 305 et seq.). Thus, in order to provide divergence by means of a diffuser for an application in which a large increase in cross sectional flow area would be required, an undesirably long passage must be employed, which results in excessively large and expensive ducting components. The greater the difference between the area of the downstream chamber and the area of the incoming conduit, the greater the necessity for some reliable means of distribution of the flow according to some predetermined profile.

The term "characteristic dimension" (CD) of the inlet conduit refers to that dimension of the inlet conduit, which would be used to compute the Reynolds number of the flow in the inlet conduit. Thus, for example, in the case of an inlet duct of circular cross-section the CD would be the diameter thereof and in the case of an inlet duct of square cross section the CD would be one side of the square.

SUMMARY OF THE INVENTION

The flow-through distribution means of this invention is located at the juncture between upstream and downstream ducting components and is arranged to receive the full fluid flow therethrough. The flow-through distribution means, which may be a controllably adjustable device, is provided with apertures of different sizes at least some of which are defined by blade-like members able to direct or deflect fluid flow depending upon the attitude thereof relative to the fluid flow. The fluid flow leaving the flow-through distributor means is transformed into free stream flows separated by turbulent layers. As the flow moves downstream adjacent free stream flows gradually intermingle, the turbulence disappears and the desired velocity profile results. Any given arrangement of apertures will impress a prepatterned variation in flow resistance and flow deflection on the fluid flow passing therethrough, which affects the fluid flow during traversal of the flow-through distributor means and for a short distance downstream thereof, after which the fluid flow readjusts itself into the desired velocity profile relative to the confining walls of the downstream ducting component. The apertures imposing the greatest flow deflection upon fluid in the flow present the least resistance to flow while the apertures imposing the least flow deflection upon fluid in the flow present the greatest resistance to flow.

The portion of the surface of the flow-through distribution means having apertures, which provide maximum flow resistance (a) will have a solidity of less than about 50%; (b) the included angle ($2\theta$) to the blade-like members providing maximum flow deflection will have a minimum value of about 40°, and (c) the portion of the surface of the flow-through distribution means having apertures, which provide minimum flow resistance, will have a solidity of greater than about 2%.

BRIEF DESCRIPTION OF THE DRAWING

Objects and advantages of this invention will hereinafter become more fully apparent from the following description of the annexed drawings, which illustrate several embodiments of this invention in an exemplary environment, and wherein:

FIG. 5 and FIG. 6 are a partial front elevational view and a partial side elevational view (shown in section), respectively, of another embodiment of a prepatterned flow distributor constructed in accordance with this invention;

FIG. 8 is a partial sectional view through an adjustable flow distributor in accordance with this invention;

FIG. 8a is a detailed view showing means for selectively adjusting the flow distributor of FIG. 8;

FIGS. 9 and 10 are schematic representations of the manner in which a desired velocity profile may be aerodynamically (and hydrodynamically) established by the device of this invention indicating the gradual changes in flow velocity resulting in the development of such a profile;

FIG. 11 illustrates a preferred embodiment of this invention together with a schematic representation of the developing flow pattern from the substantially uniformly varying resistance and the gradual increase in flow deflection angle;

FIGS. 12 and 13 are, respectively schematic representations of the prior art flow distribution of gases passing from the compressor to the combustor of a gas turbine and the use of this invention to produce a more desirable engine structure; and FIG. 14 is a graphic representation of flow regimes in plane-wall subsonic diffusers indicating the capacity of this invention to successfully operate outside the region in which conventional diffusers must be operated to avoid flow separation.

DESCRIPTION OF THE PREFERRED EMBODIMENT

Figure 1:
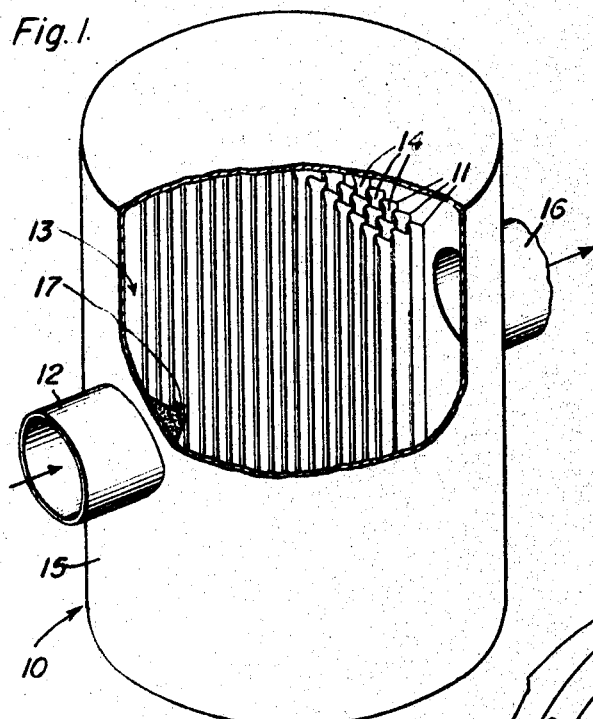
FIG. 1 is a perspective view partially cut away of a moisture separator wherein this invention may be advantageously employed.
Figure 7:
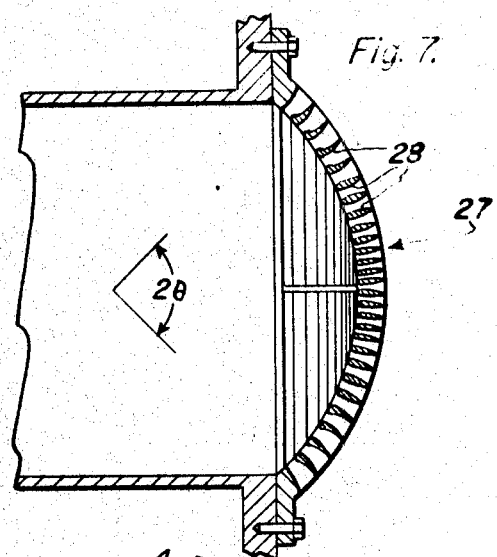
FIG. 7 is a sectional view of a preferred embodiment of this invention wherein the solidity and turning angle of the cascade are simultaneously varied.

The moisture separator 10 shown in FIG. 1 is employed to effect the removal of droplets of condensate in steam being conducted from a nuclear high pressure turbine to a low pressure turbine. This separation is to be accomplished by the series of closely-spaced corrugated sheets 11. Ideally, the steam entering via inlet conduit 12 is to enter the moisture separator 10 with the flow spreading out after entry into chamber 13 with a minimum of losses and achieving a uniform velocity profile at, or just prior to, the location of sheets 11. As the steam flow passes through spacings 14 between sheets 11 it is forced to negotiate a serpentine path. During these rapid reversals of direction the droplets of condensate are forced from the steam flow by centrifugal force. These rejected droplets strike the surfaces of sheets 11 and run down for collection by means (not shown) at the bottom of shell 15. The steam so treated then exits via conduit 16 to the low pressure turbine (not shown).

Figure 2:
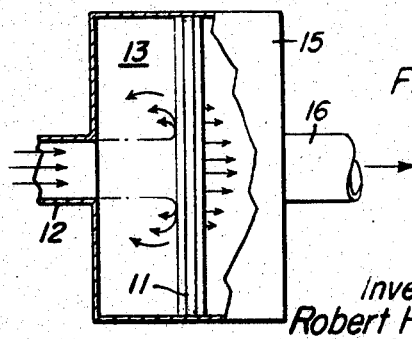
FIG. 2 is a schematic representation partially in cross-section of the type of jet penetration resulting in devices wherein high velocity fluid flow is subjected to a sudden expansion.

In practice, conduit 12 opens directly into chamber 13 without the flow distributor 17 of this invention to influence incoming flow and under such conditions there is a pronounced tendency for the incoming high velocity steam (100–200 feet per second) to penetrate into chamber 13 and strike against sheets 11 in the form of a jet leaving stagnant or low energy boundaries on all sides thereof. This jet-like penetration shown in FIG. 2 is particularly pronounced if the separator sheets 11 are placed a relatively short distance from opening of conduit 12 into chamber 13, because there is no opportunity for diffusion and controlled distribution. However, even with separator sheets 11 located some considerable distance downstream, the velocity profile experienced across the area of chamber 13 immediately before entry of the steam between sheets 11 is far from optimum. This is due to the very significant difference between the rate at which entering steam projected generally along the axis of conduit 12 proceeds at considerably greater speed than such outlying steam as may gradually spread away from the central position and be slowed down.

The disadvantage of the jet fluid delivery shown in FIG. 2 is that only a small portion of the separator sheets 11 will actually receive steam flow and even over this portion of sheets 11 the operation is not effective for the steam will have so high a velocity that much of the moisture will be blown through with the steam.

By the use of this invention the lack of control over the flow, which is manifest in the aforementioned example of a sudden enlargement of ducting components may be substantially completely overcome. Thus, by selecting the proper prepatterning of apertures in flow-through flow distributor 17, a previously unavailable degree of control over the incoming fluid flow is made possible, so much so that the velocity profile ideally suited to the particular application can be reliably produced.

In the case of the moisture separator 10 a uniform velocity profile is particularly advantageous. Uniform velocity profiles produced with several different embodiments are shown in FIGS. 9, 10 and 11 and several embodiments having varying degrees of energy loss yet all capable of generating uniform velocity profiles are shown in FIGS. 3–7. These constructions can, of course, be varied in the design of the various parameters, such as the solidity, the amount and distribution of the resistance to flow, the degree of change of the deflection angle as a function of distance from the region of zero flow deflection (which coincides with the region of greatest flow resistance) and the magnitude of the maximum angle of flow deflection.

Figure 3:
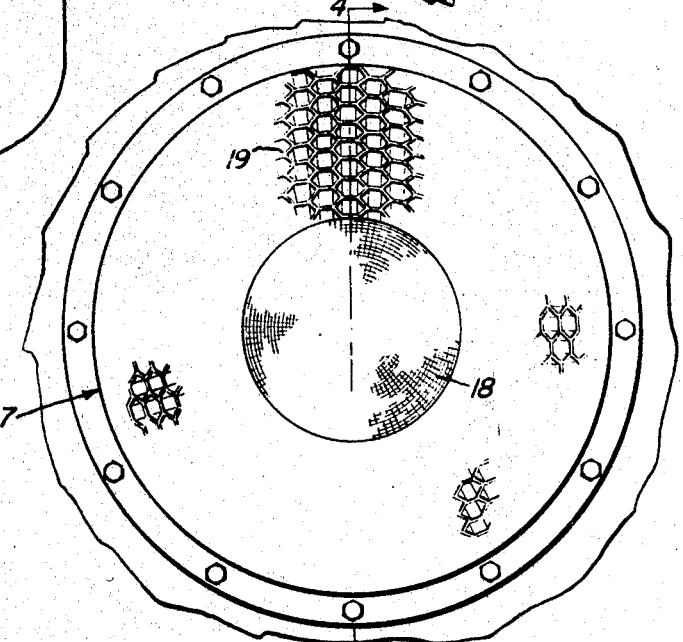
FIG. 3 and FIG. 4 are a front elevational view and a side elevation view (partially in section), respectively, of a prepatterned flow distributor constructed in accordance with this invention.
Figure 4:
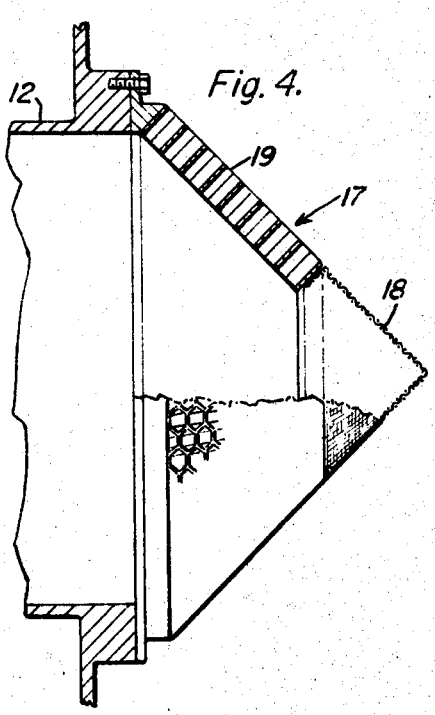

Thus, in the embodiment 17 of FIGS. 3 and 4 the extent and solidity of screen 18 may be varied and, as well, the extent, solidity and angular disposition of the honeycomb structure 19. In flow distributor 21 (FIGS. 5 and 6) similar variations can be effected with screens 22 and 23 (which overlap and produce two regions of flow resistance) and concentrically arranged bars 24, which are all supported by struts 26. Flow distributor 27 (FIG. 7) illustrates a preferred arrangement wherein the desired velocity profile can be achieved with a minimum of energy loss by varying the solidity (spacing) and turning angle of the cascade (bank of annular airfoil sections 28). By way of comparison screens will induce greatest energy loss, spaced bars will induce less energy loss than screens, and spaced airfoil sections will induce the least energy loss of the three. In the case of spaced annular bars 24 and spaced annular airfoil sections 28, the width (chord distance, C) in the direction of flow should be related to the spacings between members (pitch, P) to insure capacity to deflect the flow. To meet this criterion, the ratio of $C/P$ will have a value of 1.3 in those portions the flow stream in which the exit flow direction must be substantially parallel to the deflecting members. This ratio may range down to some small value approaching zero as the deflection angle of the fluid is progressively smaller. In the case of airfoil sections 28 ratios greater than 1.3 may be used.

In the aforementioned constructions uniform velocity profiles result because the loss (or resistance) distribution and the degree of flow deflection bear the proper relationship for creating this effect. As may be seen in FIGS. 9, 10 and 11 by the vectors showing both velocity and direction a stabilized uniform velocity profile results after readjustment of transitional flow in which larger loss distribution is induced in any portion of the fluid flow experiencing relatively small angles of divergence and smaller loss distribution is induced in any portion of the flow experiencing relatively large angles of divergence. A three-dimensional consideration of FIG. 10 indicates that as the fluid flow leaves flow distributor 21 it has been transformed into a plurality of nesting sheets of free stream (not confined by walls) jets separated by turbulent (shear) layers. This turbulence gradually disappears as the intermingling of adjacent nesting sheets occurs to produce the desired velocity profile. In each of FIGS. 9, 10 and 11 the incoming fluid flow is subjected to a larger total pressure drop (greater flow resistance) in the central region of flow. Other-than-uniform preselected velocity profiles will, of course, require less, or greater, resistance to flow in the central region of flow and this invention is intended to include such constructions as well.

Also, advantageously a given flow distribution device will enable the preselection of a number of variations in flow resistance. Such a structure 31 is shown in FIG. 8 designed to enable the relative adjustment of perforated elements 32, 33 so as to provide a selection of velocity profiles with the flow resistances being variable such that the resistance in the center region will be less than, equal to or greater than the resistance in the region of maximum flow deflection. Relative adjustment of elements 32, 33 may be effected by movement of rod 34, which in turn rotates movable rim 36 within the limits permitted by slotted holes 37. The holes 38, 39, 41, 42 in element 32 may be slotted or circular and of appropriate length as dictated by the specific range of velocity profiles desired.

As is shown as well in the schematic representations in FIGS. 12 and 13, the various patterns of flow distribution desired will depend upon the specific requirement of the resultant velocity profile. FIG. 12 shows the compressor-combustor of a conventional gas turbine power plant 44. Pressurized air leaves compressor 46 and passes to combustor 47 through the diffuser 48 made up of the outer wall 49 and the inner wall 51. Although a non-uniform velocity profile is desired in this application, the velocity profiles resulting from diffusers are not the optimum and considerable improvement is possible by the use therein of this invention as, for example, is shown in FIG. 13. The flow distributor 52 is similar to the device shown in FIG. 7 in that it is made up of a series of concentrically-arranged rings 53 each having an airfoil shape in cross section, the rings 53 being spaced to provide the requisite variation in solidity and oriented to provide appropriate deflection for portions of the flow at different radii. As may be seen by comparing FIG. 12 and FIG. 13, the entire diffuser 48 (walls 49 and 51) of the structure of FIG. 12 may be eliminated by the use of this invention, thereby resulting in a decrease in the overall length of the engine (combustion liner 47 is moved closer to the inlet from the compressor 46). An adavntage in addition to the provision of an optimum velocity profile and considerably shortened engine is the elimination of the possibility of the occurrence of transitory stall conditions, which result in hot spots in the combustion chamber 47. These hot spots cause burnout and, as well, hot spots on the turbine nozzles (not shown) receiving gases discharged from combustor 47. By no longer having to rely upon the inner wall 51 to scoop air for presentation to the end of liner 47 at low velocity greater combustion stability and a self-balancing flow to either side of liner 47 results.

One of the phenomena primarily responsible for the success of this simple but very effective structure is the diffusion effect which is induced in the deflected flow even in regions at substantial distances downstream from the flow-through distributor whereby it becomes possible to produce predetermined differences in velocity necessary to provide some desired velocity profile. The velocity of portions of the flow further from the center region is reduced most quickly, because the cross sectional area of flow thereof becomes larger most quickly in accordance with the well-known relationship $Q=VA$ (Q being rate of flow, V being velocity of fluid flow and A, the area of flow).

Other most unusual aspects of this invention are (a) the short distance in which the desired velocity profile may be produced and (b) the absence of the necessity of diffuser walls. It has been shown, for example, that if the included angle for maximum flow deflection ($2\theta$) is 90°, the flow will have been distributed to at least three times the characteristic dimension (CD) of the inlet conduit by the time the flow has moved downstream a distance CD. When $2\theta$ is equal to about 140° the flow shall have been distributed to about 8.8 CD of the inlet conduit in moving downstream a distance CD. The location of the downstream station at which the desired profile is developed is a function of the apparatus and is relatively independent of the incoming flow conditions of pressure and velocity. The invention is equally applicable to situations of axial symmetry of inlet and downstream conduits and, as well, to applications with nonaxially symmetrical flow areas.

A most effective illustration of the unobviousness of this invention lies in a review of the unusual results produced therewith, these results being shown to some extent in FIG. 14. The portion of FIG. 14 shown in solid lines is a graphic representation of the flow regimes in plane-wall two-dimensional subsonic diffusers (Journal of Basic Engineering article "On the Nature of Stall" page 322 referred to hereinabove). These values have been extrapolated to values of $L/W$ between 0.5 and 1 (shown in dotted lines) in order to give some basis of comparison with the instant invention. The value of L represents the length of the diffuser wall and W is the width of the inlet conduit. It is to be noted that both the ordinate and the abscissa are plotted on logarithmic scales.

As is shown therein, the shaded region, which lies between lines a—a and b—b represents the approximate region of unsteady flow separation (transitory stall region) for diffusers. Above line b—b is the approximate region of fully developed stall in which conventional diffusers cannot operate. In contrast thereto, the prepatterned flow distributor of this invention makes possible the transition from up-stream to downstream flow conditions at values of 90° and larger and at values of $L/W$ as small as about 0.5 without flow separation, which conditions result in the breakdown of diffusion in walled diffusers.

Thus, without the necessity for walled diffuser passages through the region of flow transition and in an unexpectedly short distance downstream this invention has made possible prepatterning of the downstream velocity distribution in a system of incoming fluid flow by varying the loss in relation to the extent of flow deflection of portions of the incoming fluid stream without excessive shear in the fluid using patterns of solid and apertured regions to provide a flow diffuser having a maximum solidity of less than about 50 percent and having an included angle for maximum flow deflection therein with a minimum value of about 40°. In nonsymmetrical applications angle $\theta$ (one half of $2\theta$) is the appropriate measure and angle $\theta$ may be considered (a) as the angle representing the maximum deflection of flow from the axis of the flow coming into the device or (b) as the angle between the path of the flow passing through the device with minimum deflection and the path of the flow passing through the device with maximum deflection.

Obviously many modifications and variations of this invention as specifically illustrated are possible in the light of the above teachings. It is, therefore, to be understood that within the scope of the appended claims, the invention may be practiced otherwise than as specifically described.

What we claim as new and desire to secure by Letters Patent of the United States is:

1. A flow distributor for producing a controlled three-dimensional flow velocity distribution within a fluid flow to enable traversal of the flow through a region of changed flow area and/or flow direction comprising in combination:
   (a) a first flow-through portion having a plurality of apertures and
   (b) a second flow-through portion having a plurality of apertures and being connected to said first portion,
      (1) the apertures of said second portion being defined by blade-like members angularly disposed relative to flow path of minimum deflection through said first portion, said apertures of said second portion receiving and deflecting at least a portion of the fluid,
      (2) said blade-like members being so arranged that the maximum angle between the path of flow leaving said second portion and the path of flow of minimum deflection leaving said first portion has a minimum value of about 20°,
      (3) the apertures of said first portion including substantially non-flow deflecting apertures presenting significantly greater flow resistance than apertures of said second portion, and
      (4) said first portion presenting greater flow resistance than said second portion and said first and second portions generating separating three-dimensional free stream flows, each free stream flow being separated from any adjacent free stream flow by a thin layer of turbulent flow deliberately induced, both portions having values of solidity less than about 50% and said second portion providing greater flow deflection than said first portion.

2. The flow distributor substantially as recited in claim 1 wherein the separate values of solidity of the flow-through portions of the flow distributor are in the range of from less than about 50% to greater than about 2%.

3. The flow distributor substantially as recited in claim 1 wherein the first flow-through portion is screening.

4. The flow distributor substantially as recited in claim 1 wherein the first flow-through portion comprises screening and the second flow-through portion comprises spaced bars concentrically arranged about a central axis and angularly disposed relative to said central axis, combination of said portions being arranged in a generally conical configuration.

5. In a ducting system wherein fluid flow is subjected to a transition in area or direction of flow from an upstream ducting component to a downstream ducting component, the improvement comprising means for controllably passing and deflecting fluid flow as free stream flows separated by turbulent flow, said means receiving the entire fluid flow between said ducting components and comprising at least first and second flow-through portions each having a value of solidity of less than about 50%, said second portion being in alignment with said first portion and comprising spaced blade-like elements angularly disposed relative to the direction of flow through the upstream ducting component and defining a plurality of apertures through which at least a portion of the flow will be deflected from said direction of flow as free stream flow, said blade-like elements being so arranged that the maximum angle of deflection of flow from said direction of flow has a minimum value of 20°, said first portion comprising substantially non-flow deflecting apertures producing significantly greater flow resistance than apertures contained in said second portion.

6. The improvement substantially as recited in claim 5, wherein the blade-like elements have airfoil configurations arranged in a generally conical configuration.

7. The improvement substantially as recited in claim 5, wherein the separate values of solidity of the flow-through portions of the flow distributor are in the range of from less than about 50% to greater than about 2%.

8. The improvement substantially as recited in claim 5, wherein the first flow-through portion comprises a screen.

9. The improvement substantially as recited in claim 5, wherein the first flow-through portion comprises screening and the second flow-through portion comprises spaced bars concentrically arranged about a central axis and angularly disposed relative to said central axis, combination of said portions being arranged in a generally conical configuration.

10. The improvement substantially as recited in claim 5 wherein the solidity of at least one of the flow-through portions is adjustable.

11. A fluid flow system having a fluid flow distributor therein for introducing differential flow resistance and flow deflection to three-dimensional fluid flow passing therethrough to produce downstream thereof a three-dimensional predetermined gradient of total pressure, e.g. velocity profile, to optimize traversal of the fluid flow into a region of changed cross-sectional flow area comprising in combination:
   (a) an upstream conduit,
   (b) a downstream conduit in which the direction of stabilized fluid flow is substantially parallel to the direction of the fluid flow in said upstream conduit and
   (c) means located between said upstream and downstream conduits for receiving and controllably passing and deflecting in separate free stream flows the fluid flowing from said upstream conduit to said downstream conduit with the adjacent free stream flows separated by thin layers of turbulent flow, said means comprising a plurality of apertures and solid defining elements therefor, the aperture/defining element combinations including substantially non-flow deflecting first combinations deliberately presenting appreciable resistance to fluid flow and second combinations presenting substantially less resistance to fluid flow than said first combinations and simultaneously imposing fluid flow deflection such that the included angle of maximum flow deflection is greater than about 40°.

12. The fluid flow system as recited in claim 11 wherein the first apertures are located near the central axis of fluid flow exiting from the upstream conduit.

References Cited

UNITED STATES PATENTS

| | | | |
|---|---|---|---|
| 847,412 | 3/1907 | Keller | 138—41 |
| 1,049,407 | 1/1913 | Scheurmann | 138—37 |
| 1,471,704 | 10/1923 | Palizza | 138—40 X |
| 2,662,553 | 12/1953 | Dimmock | 138—37 |
| 2,684,690 | 7/1954 | Lee. | |
| 2,768,814 | 10/1956 | Frey et al. | 138—37 X |
| 2,976,954 | 3/1961 | Irwin | 55—442 X |

LAVERNE D. GEIGER, Primary Examiner

E. J. EARLS, Assistant Examiner

U.S. Cl. X.R.

55—418; 138—46